United States Patent Office 2,943,983
Patented July 5, 1960

2,943,983

PROCESS OF OBTAINING CONCENTRATES OF VITAMINS OF THE $B_{12}$ GROUP FROM WASTE LIQUORS AND RESIDUAL PRODUCTS OF INDUSTRIAL FERMENTATION PROCESSES

Konrad Bernhauer, Wilhelm Friedrich, Gisela Gross, and Siegfried Spaude, Aschaffenburg (Main), Germany, assignors to Aschaffenburger Zellstoffwerke, A.G., Aschaffenburg (Main), Germany No Drawing. Filed Mar. 16, 1956, Ser. No. 571,903

Claims priority, application Germany Mar. 19, 1955

7 Claims. (Cl. 195—96)

This invention relates to a process for obtaining concentrates of vitamins of the $B_{12}$ group, and more particularly to a process for preparing such concentrates from fermentation products obtained by methane fermentation from waste liquors and residues of industrial fermentation processes.

This application is a continuation-in-part application of patent application Serial Number 381,147, filed September 18, 1953, by Konrad Bernhauer and Wilhelm Friedrich.

It is one object of our present invention to provide new natural sources for obtaining concentrates of the vitamins of the $B_{12}$ group.

Another object is to provide a new starting material for the processes described in the pending applications, supra.

It is still another object of the invention to provide a process for preparing concentrates of the vitamins of the $B_{12}$ group from fermented products obtained by methane fermentation of waste liquors and residues of industrial fermentation processes, which process leads to a higher vitamin content in the resulting end concentrates.

A further object is to provide a process for preparing the new sources of vitamin $B_{12}$ concentrates by a new process involving inoculation of the waste product of the industrial fermentation process with other waste liquors.

These and other objects are attained by the process according to our invention which is based on our discovery that the waste liquors and residues of industrial fermentation are excellent natural sources for the vitamins of the $B_{12}$ group.

As described in the patent application Serial No. 381,147, the vitamin content of sewage sludge which is in the order of 0.01 to 0.05 gram per cubic meter (cb. m.) of sludge is increased to from 0.25 to 1.0 gram per cb. m., by converting the sewage sludge into digested sludge with the aid of methane fermentation. This digested sludge which has a content of dry matter in the order of 8 to 12 percent by weight, and contains about 0.25 to 1.0 gram of vitamins of the $B_{12}$ group per cubic meter, as stated above, is then treated with clarifying agents such as iron chloride or aluminum sulfate, in quantities of 0.4 to 0.8 percent by weight, and sulfur dioxide or salts of sulfurous acid are added to the fermented sludge in such quantities that the $SO_2$ content of the latter is in the order of 0.05 to 0.2 percent. The pH value is maintained between 5 and 8, and preferably between 6 and 7.

As a next step in the process the sludge is treated in the manner described above, is then subjected to a heat treatment in a suitable heating plant in order to liberate vitamin $B_{12}$, heating of the sludge being at temperatures between 50° C. for 3 hours to 120° C. for 5 to 10 minutes, the lower temperature ranges thus requiring a longer and the higher temperatures a much shorter heat treatment.

The sludge is then separated into a substantially solid and a substantially liquid component by means of a separating device which may consist of any suitable apparatus such as a vacuum revolving filter or similar filter, a sludge centrifuge, or the like.

If the resulting filtrate or centrifuged solution is not sufficiently clear, the same is adjusted to a pH value of 3 to 5 by adding a proton donator of suitable concentration, so as to flocculate the remaining dispersed impurities, and filtering or centrifuging is repeated.

In most cases this leads to a clear solution with a dry matter content of from 0.5 to 1.0 percent containing all the vitamin $B_{12}$ that was present in the fermented sludge. This clear solution thus contains about 0.05 to 0.1 gram vitamin $B_{12}$ per kilogram of dry matter, which corresponds to a little more than 0.25 to 1.0 gram of vitamins of the $B_{12}$ group per cb. m. of solution.

The clear solution is then further processed in a known manner by adding an adsorbent to the solution, separating the adsorbate of the vitamin $B_{12}$ from the solution, eluting the adsorbate with a suitable eluting agent.

Adsorbents suitable for use are active carbon, fuller's earth, adsorbent clay, and the like substances. A suitable eluting agent for active carbon is e.g. a mixture of 10 parts by volume of n-butanol and 90 parts of water.

An eluate of this kind may be used for preparing an animal feed supplement having vitamin $B_{12}$ activity, by incorporating the eluate into a suitable carrier substance such as feed yeast, soya (shot) grit, and the like. It is, of course, possible to give such feeds a desired vitamin $B_{12}$ activity.

On the other hand, the eluate may also be further purified and used for the preparation of crystallized vitamin $B_{12}$.

Our present invention is based on the discovery that waste liquors and residual products of the industrial fermentation processes lead to fermentation products in the form of fermentation broths or usually thin sludges which contain an unexpectedly high vitamin $B_{12}$ activity and, therefore, are excellent sources for the preparation of concentrates of vitamins of the $B_{12}$ group.

The following waste liquors and residues were found by us to be particularly suited for the microbiological production of vitamins of the $B_{12}$ group through methane fermentation:

(1) Waste liquors and residues of yeast plants, distilleries and breweries, (2) Waste liquors and mycelial residues of fermentation plants producing antibiotica, (3) Waste liquors and mycelial residues of fermentation plants producing citric acid, (4) Waste liquors of fermentation plants producing butanol and acetone, and (5) Waste liquors of fermentation plants producing lactic acid.

We have further discovered that the mixtures of sludges of waste liquors from miscellaneous industrial plants of all kinds and of domestic sludges, as they are, for instance, accumulated in the sewage plants of our big cities, are little suited for a methane fermentation process directed to generate satisfactory contents of vitamins of the $B_{12}$ group in the fermentation products. This is largely due to the fact that, in such miscellaneous mixed sludges, there are contained waste liquors of processes of the metal treating and processing industries which are unsuitable for the production of $B_{12}$ vitamins since it is practically impossible to ferment them.

It is, therefore, one important feature of the present invention that in the process of subjecting waste liquors to methane fermentation, the waste liquors and other residual products of the fermentation industries which are to be used as the starting material for the present process, must be collected separately from the industrial waste products of the various other plants of a big city which yield sludge. Only the waste products of the industrial fermentation industries which have been subjected to methane fermentation are used to produce microbiologically the vitamins of the $B_{12}$ group therein.

Thus, the waste liquors of the fermentation plants producing yeast and alcohol, when subjected by themselves to methane fermentation, yield a fermentation broth which is valuable due to its high content in vitamins of the $B_{12}$ group.

Another feature of our invention consists of using mixtures of waste products of various processes of industrial fermentation as sources for the production of $B_{12}$ vitamins. More particularly we use, for instance, mixtures of waste products from fermentation processes for the production of antibiotica inoculated with the products obtained by methane fermentation from waste products of yeast plants and distilleries.

According to another feature of our invention, the waste liquors and other residual products of the processes of industrial fermentation are combined with the sewage liquors and domestic sludges of a city. The resultant mixtures of waste products are then subjected to the conventional methane fermentation, for instance in the sewage fermentation plant of the city. We have found that by this step a considerable increase in the vitamin $B_{12}$ activity of the fully digested sludge can be obtained.

As a result of the methane fermentation of the above described new sources for the microbiological production of vitamins of the $B_{12}$ group, digested sludges are obtained which contain approximately three to ten times the amount of $B_{12}$ vitamins per unit of volume that can be found in the digested sludge obtained by the conventional methane fermentation of a mixture of all waste liquors and residues in the sewage fermentation plants now in use in our cities.

As a further important feature, the digested sludges obtained according to our invention only contain, on an average, a dry matter content of 1 to 2% while the conventionally produced digested sewage sludge has generally a dry matter content of the order of 8 to 12%.

The low dry matter content in the digested sludges according to the invention greatly facilitates the further processing to produce $B_{12}$ vitamin concentrates, since the ratio of vitamin $B_{12}$ content to the dry matter content is even more favorable than the $B_{12}$ vitamin content per unit volume of the digested sludge.

This greatly increased ratio of content in $B_{12}$ vitamins to dry matter content thus offers the advantage of a novel, greatly simplified and less expensive production of vitamin $B_{12}$ concentrates. It is now possible, through the present invention, to apply the methane fermentation to waste products of fermentation plants located at too great a distance from a municipal sewage fermentation plant, since the fact that $B_{12}$ vitamin concentrates can be produced apart from the conventionally obtained methane, now warrants the establishment of a methane fermentation plant on the basis of a fermentation plant in the country, i.e. away from a city, where such methane fermentation plant could not have operated economically in the past. The present invention therefore helps to solve the problem of waste product disposal for such plants, which is of considerable importance for public health.

The fermented product obtained according to the invention from a methane fermentation of the new sources of $B_{12}$ vitamins is permitted to settle, whereby a sludge containing 1 to 2% weight by volume of dry matter is obtained, which is then processed according to the modes of operating described in the aforementioned patent application Serial No. 381,147.

Thus, the sources for $B_{12}$ vitamins according to this invention comprise waste liquors and residues from all kinds of industrial fermentation processes mentioned above such as processes for making streptomycin, aureomycin, terramycin and tyrothricin and other antibiotica. Furthermore, these sources comprise the waste products of fermentation processes for the production of enzymes by microbiological methods, as well as the fermentation processes for making gluconic acid, itaconic acid, fumaric acid and the like organic substances.

The invention is further illustrated by the following examples without the field of the invention being thereby limited.

Example I

The waste liquors of a yeast plant, and distillery which consist of a molasses or cereal slurry and suspended yeast diluted with wash water, are subjected in a conventional manner to methane fermentation. The fermentation process takes place at a pH range between 7.0 and 7.5 at temperatures between 28 and 30° C. under fervent development of gas. It is a continuous process, fresh waste liquors being continuously or intermittently fed into the fermentor and the digested broth being withdrawn from the same in the form of a thin digested sludge. The sludge thus obtained is permitted to settle so as to contain a dry matter content of 1 to 2%.

32 cubic meters (cb. m.) of this digested sludge having a dry matter content of 1.7% and a microbiological $B_{12}$ vitamin activity of 1.6 micrograms (gamma) per cubic centimeter (cc.) which correspond to a total $B_{12}$ vitamin content of 51 grams, are heated to 80° C. after adding about 0.2% of sodium bisulfite to the sludge, and maintained at this temperature for approximately 30 minutes. Subsequently the sludge is centrifuged to separate the solid particles therefrom. 30 cb. m. of a centrifugate are obtained, which shows a microbiological $B_{12}$ vitamins activity of 1.45 gamma per cc., which corresponds to a total $B_{12}$ vitamins content of 43.5 grams. By adding 1% weight by volume of active carbon to the centrifugate under stirring, the vitamins of the $B_{12}$ group are adsorbed on the carbon. After separating the carbon by centrifuging, 900 kilograms (kg.) of a moist adsorbate having a dry matter content of 33% are obtained, which shows a microbiological vitamins $B_{12}$ activity of 47.5 gamma per gram corresponding to a total vitamin $B_{12}$ content of 42.5 grams.

After exhaustive elution of the carbon adsorbate, the eluate is concentrated to a volume of 100 liters. This concentrate has a microbiological vitamins $B_{12}$ activity of 404 gamma per cc., corresponding to a total $B_{12}$ vitamins content of 40.5 grams. The vitamins of the $B_{12}$ group are transferred to the organic phase (i.e. dissolved in an organic solvent) by extraction with a solution of 25% weight by volume of parachlorophenol in orthodichlorobenzene. The organic phase is then washed with a buffer solution of pH 7.0 and distilled water. The vitamins of the $B_{12}$ group are then transferred to the aqueous phase by adding 7% volume by weight of isopropanol to the organic solvent, and the resulting aqueous phase is then washed with ortho-dichlorobenzene. 90 liters of a purified aqueous extract are obtained which has a microbiological vitamins $B_{12}$ activity of 445 gamma per cc. which corresponds to a total $B_{12}$ vitamins content of about 40 grams. From this solution the vitamins of the $B_{12}$ group are precipitated by adding 2.2% w./v. of para-chlorophenol and about 3% of kieselguhr and adjusting the pH value to 3.0. The precipitate is suction-filtered, washed with acetone, and dried. 3 kg. of a kieselguhr adsorbate showing a microbiological vitamins $B_{12}$ activity of 13.3 mg. per grams of adsorbate, i.e. a total vitamins $B_{12}$ content of about 40 grams are obtained.

*Example II*

Waste products of a fermentation process for producing penicillin are used as a source for the production of $B_{12}$ vitamins. 200 kg. of mycelia of *Penicillium chrysogenum* having a dry matter content of about 20% are finely ground in the moist state, and subsequently suspended in 2 cb. m. of a neutralized waste liquor obtained after extraction of the penicillin content from a fermentation broth. 0.5 cb. m. of a digested sludge obtained from the methane fermentation of waste liquors of a yeast plant and distillery are added to the aforesaid suspension as an inoculating agent, and the resulting mixture subjected to methane fermentation. The sludge used for inoculation has a microbiological vitamins $B_{12}$ activity of 1.5 gamma per cc. and a dry matter content of 1.0%. Temperature during fermentation is held at about 30° C. and the pH value in the range from 7.0 to 7.6. After seven days dating from the time of inoculation, the development of methane reaches a maximum, and after fourteen days, the fermentation process is practically complete. The resulting digested broth of a volume of 2.5 cb. m. has a dry matter content of 1.4% w./v., and a microbiological $B_{12}$ vitamins activity of 1.7 gamma per cc. which corresponds to a total $B_{12}$ vitamins content of about 4.25 grams. This broth is then processed in the same manner as described in Example I. The final kieselguhr adsorbate amounts to 500 grams having a microbiological $B_{12}$ vitamins activity of 7.5 milligrams per gram of adsorbate, corresponding to a total $B_{12}$ vitamins content of 3.75 grams.

*Example III*

Waste products of the industrial fermentation process for producing citric acid are used as the source for producing a $B_{12}$ vitamins concentrate.

100 kg. of moist mycelia of *Aspergillus niger*, which contains 22% of dry matter and represent a waste product of citric acid fermentation, are ground in the wet state, and subsequently suspended in 1000 liters of mother liquor obtained from the fermentation broth of the same process following the separation of calcium citrate. 250 liters of a digested sludge obtained by the methane fermentation of waste liquors of a yeast plant and distillery are added thereto. Fermentation of the sludge should be in full progress. The resulting mixture is subjected to methane fermentation for ten days at a temperature of about 30° C. and a pH between 7.5 and 8.5. A digested broth is obtained at the end of this period, which contains 2.4% of dry matter and shows a microbiological vitamins $B_{12}$ activity of 1.5 milligrams (mg.) per liter corresponding to a total vitamin $B_{12}$ content of 1.9 grams.

After adding 0.2% weight by volume of sodium bisulfite to the digested broth, the latter is heated for 30 minutes to 80° C., and thereafter centrifuged in order to separate the solid particles from the broth. The solid matter is removed from the centrifuge and discarded. The resulting centrifugate has a volume of 1100 liters and shows a microbiological vitamins $B_{12}$ activity of 1.35 mg. per liter which corresponds to a total $B_{12}$ vitamins content of about 1.5 grams. By acidification the centrifugate to a pH of 2.6 at temperatures between 10 and 20° C., the colloids still present in the solution and causing its opaqueness, are flocculated and removed from the solution by means of a Sharples centrifuge. The resulting 1000 liters of centrifugate have a microbiological vitamins $B_{12}$ activity of 1.3 mg. per liter corresponding to a total vitamin $B_{12}$ content of 1.3 grams. 5 kg. of bentonite are added to the thus clarified solution under thorough stirring at temperatures between 10 and 20° C. After stirring has lasted for about 90 minutes, the resulting bentonite adsorbate containing the $B_{12}$ vitamins is obtained by centrifuging, and the supernatant liquid is discarded. The bentonite adsorbate is then subjected to fractional elution under constant stirring at temperatures from 50 to 60° C. and a pH of about 8.5, using a total of 100 liters of a solution of 2% w./v. of sodium bicarbonate and 0.1% w./v. of sodium bisulfite as eluting agent. The eluted bentonite is discarded. The eluates which now contain the entire $B_{12}$ vitamin activity are combined, their pH is adjusted with the aid of hydrochloric acid to a value of 7.0, and 1% w./v., i.e. about 1 kg. of active carbon is added to the combined eluate under stirring for about an hour. This step is carried out at a temperature of about 20° C. The carbon adsorbate is then obtained by centrifuging, the supernatant liquid is discarded, and the resulting adsorbate contains the entire $B_{12}$ vitamins activity. Approximately 3 kg. of moist carbon adsorbate are obtained which have a dry matter content of about 30% and a microbiological vitamins $B_{12}$ activity of about 420 gamma per gram, i.e. a total $B_{12}$ vitamins content of about 1.25 grams. The elution of the carbon adsorbate and the further steps of purifying the vitamin-containing eluates are then carried out in the same manner as described in Example I. Finally, 120 grams of a kieselguhr adsorbate are obtained which have a microbiological vitamins $B_{12}$ activity of 9.6 mg. per gram of adsorbate, i.e. a total $B_{12}$ vitamins content of about 1.15 grams.

*Example IV*

The waste products of the industrial fermentation process of producing butanol and acetone are used as a source for producing vitamin $B_{12}$ group concentrates. 1000 liters of the slurry obtained in the aforesaid fermentation process after distilling off the solvents, are inoculated with 250 liters of a digested sludge obtained by the methane fermentation of waste liquors of a yeast plant and still being in full fermentation. The methane fermentation of the resulting broth is carried out for eight days at a temperature of 28° C. and at a pH between 7.5 and 8.5. The resulting digested broth has a dry matter content of 1.5% and shows a microbiological $B_{12}$ activity of 1.3 mg. per liter corresponding to a total $B_{12}$ vitamins content of about 1.6 grams. The broth is processed further as described in Example III. Finally, 100 grams of a kieselguhr adsorbate are obtained which has a microbiological vitamins $B_{12}$ activity of 10 mg. per gram adsorbate, i.e. a total vitamin $B_{12}$ content of about 1 gram.

*Example V*

The waste products of an industrial fermentation process for making lactic acid are used as a source for concentrates of vitamins of the $B_{12}$ group. 1000 liters of a mother liquor obtained from the aforesaid process after separating calcium lactate from the fermentation broth, are mixed with other waste product of the same process obtained by filtration of the original fermentation broth and consisting of bacterial masses and unconsumed calcium carbonate. The resulting broth is inoculated with 250 liters of digested sludge being in a state of high fermentation, which sludge is obtained by methane fermentation of the waste liquors of a yeast plant and distillery. The methane fermentation of the inoculated broth is carried out during eight days at a temperature of 29° C. and at a pH from 7.5 to 8.5. The resulting digested broth has a dry matter conent of 1.8% w./v., and shows a microbiological vitamins $B_{12}$ activity of 1.2 mg. per liter, i.e. a total vitamins $B_{12}$ content of about 1.5 grams. This broth is processed in the same manner as described in Example III. The finally obtained 120 grams of kieselguhr adsorbate show a microbiological vitamins $B_{12}$ activity of 7.5 mg. per gram, corresponding to a total vitamins $B_{12}$ content of 0.9 gram.

It will be understood that this invention is susceptible to further modification and, accordingly, it is desired to comprehend such modifications within this invention as may fall within the scope of the appended claims.

What is claimed is:

1. In a process for producing vitamins of the $B_{12}$ group from a digested sludge, the method of producing a new type of digested sludge as sludge material for the aforesaid process, which method comprises the steps of (1) inoculating a waste product of at least one industrial fermentation process selected from the group consisting of the waste liquors and mycelial residuals of (a) yeast and spirit plants, the waste liquors and residuals of (b) breweries, (c) the production of antibiotica by fermentation, (d) the production of citric acid by fermentation, (e) the production of butanol and acetone by fermentation, and (f) the production of lactic acid by fermentation; with a mixed culture consisting of sewage sludge from an industrial fermentation process previously subjected to the conventional steps of methane fermentation, and (2) fermenting the inoculated waste product at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

2. In a process for producing vitamins of the $B_{12}$ group from a digested sludge, the method of producing a new type of digested sludge as sludge material for the aforesaid process, which method comprises the steps of (1) inoculating the waste liquors of a yeast plant and distillery consisting of a molasses slurry and suspended yeast diluted with wash water with a mixed culture consisting of sewage sludge from an industrial fermentation process previously subjected to the conventional steps of methane fermentation, and (2) fermenting the inoculated waste product at a temperature in the order of 30° C. and at a pH of between 7.0 and 8.5, thereby obtaining a thin sludge having a dry matter content or up to 2.4% and a microbiological vitamin $B_{12}$ activity of at least about 1.2 micrograms per millimeter.

3. In a process for producing vitamins of the $B_{12}$ group from a digested sludge, the method of producing a new type of digested sludge as sludge material for the aforesaid process, which method comprises the steps of (1) suspending finely ground mycelia of *Penicillium chrysogenum* in a waste liquor left over in the known process of producing penicillin by fermentation, after conventional extraction of the penicillin content from the fermentation broth, (2) inoculating the resulting suspension with a mixed culture consisting of sewage sludge from an industrial fermentation process previously subjected to the conventional steps of methane fermentation, and (3) fermenting the inoculated suspension at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

4. In a promess for producing vitamins of the $B_{12}$ group from a digested sludge, the method of producing a new type of digested sludge as sludge material for the aforesaid process, which method comprises the steps of (1) suspending finely ground mycelia of *Aspergillus niger* in the mother liquor obtained from the fermentation broth of the conventional fermentation process for producing citric acid after separation of calcium citrate therefrom, (2) inoculating the suspension with a mixed culture consisting of sewage sludge from an industrial fermentation process previously subjected to the conventional steps of methane fermentation, and (3) fermenting the inoculated suspension at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

5. In a process for producing vitamins of the $B_{12}$ group from a digested sludge, the method of producing a new type of digested sludge as sludge material for the aforesaid process, which method comprises the steps of (1) distilling off the solvents from the slurry obtained in the conventional process for producing butanol, (2) inoculating the residue of the distillation with a mixed culture consisting of sewage sludge from an industrial fermentation process previously subjected to the conventional steps of methane fermentation, and (3) fermenting the inoculated suspension at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

6. In a process for producing vitamins of the $B_{12}$ group from a digested sludge, the method of producing a new type of digested sludge as sludge material for the aforesaid process, which method comprises the steps of (1) distilling off the solvents from the slurry obtained in the conventional process for producing acetone, (2) inoculating the residue of the distillation with a mixed culture consisting of sewage sludge from an industrial fermentation process previously subjected to the conventional steps of methane fermentation, and (3) fermenting the inoculated suspension at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

7. In a process for producing vitamins of the $B_{12}$ group from a digested sludge, the method of producing a new type of digested sludge as sludge material for the aforesaid process, which method comprises the steps of (1) mixing the mother liquor obtained from a conventional industrial fermentation process for making lactic acid, after separation of calcium lactate from the fermentation broth, with other waste products of the same process obtained by filtration of the starting fermentation broth and consisting of bacterial masses and unconsumed calcium carbonate, (2) inoculating the resulting mixture with a mixed culture consisting of sewage sludge from an industrial fermentation process previously subjected to the conventional steps of methane fermentation, and (3) fermenting the inoculated mixture at a temperature in the order of 30° C. and at a pH of between 7.0 and 8.5, thereby obtaining a thin sludge having a dry matter content of up to 2.4% and a microbiological vitamin $B_{12}$ activity of at least about 1.2 micrograms per millimeter.

References Cited in the file of this patent

UNITED STATES PATENTS

| | | |
|---|---|---|
| 1,880,773 | Buswell et al. | Oct. 4, 1932 |
| 2,202,785 | Stiles | May 28, 1940 |
| 2,447,814 | Novak | Aug. 24, 1948 |

(Other references on following page)

UNITED STATES PATENTS

| | | |
|---|---|---|
| 2,576,932 | Garibaldi | Dec. 4, 1951 |
| 2,595,499 | Wood et al. | May 6, 1952 |
| 2,646,386 | Minir et al. | July 21, 1953 |
| 2,650,896 | McDaniel et al. | Sept. 1, 1953 |
| 2,653,900 | Holland et al. | Sept. 29, 1953 |
| 2,703,302 | Rickes et al. | Mar. 1, 1955 |
| 2,715,602 | Hargrove et al. | Aug. 16, 1955 |

FOREIGN PATENTS

| | | |
|---|---|---|
| 748,043 | Great Britain | Apr. 18, 1956 |
| 922,126 | Germany | Nov. 25, 1954 |
| 496,632 | Canada | Oct. 6, 1953 |

OTHER REFERENCES

Hall: Society of American Bacteriologists Proceedings, 50th meeting, May 1950, page 21.